United States Patent [19]

Carnes et al.

[11] 3,715,305

[45] Feb. 6, 1973

[54] PROCESS FOR INCREASING SEDIMENTATION RATE OF HETEROGENEOUS COLLOIDAL SUSPENSION SYSTEMS

[75] Inventors: Joseph J. Carnes, Stamford; James H. Green; John H. Heller, both of Wilton, all of Conn.

[73] Assignee: The New England Institute, Inc., Ridgefield, Conn.

[22] Filed: Jan. 22, 1971

[21] Appl. No.: 109,038

[52] U.S. Cl. .................................................210/19
[51] Int. Cl. .............................................B01d 17/00
[58] Field of Search ...............210/DIG. 22, 19, 83

[56] References Cited

UNITED STATES PATENTS

| | | | |
|---|---|---|---|
| 3,660,234 | 5/1972 | Gray | 210/19 X |
| 2,896,922 | 7/1959 | Pohlman | 210/19 X |
| 3,594,314 | 7/1971 | Bilhartz et al. | 210/83 X |
| 3,206,397 | 9/1965 | Harvey | 210/19 |
| 3,264,213 | 8/1966 | Pau et al. | 210/19 X |

FOREIGN PATENTS OR APPLICATIONS

| | | | |
|---|---|---|---|
| 500,271 | 4/1937 | Great Britain | 210/DIG. 22 |
| 356,783 | 9/1931 | Great Britain | 210/DIG. 22 |
| 805,547 | 12/1958 | Great Britain | 210/DIG. 22 |

*Primary Examiner*—Reuben Friedman
*Assistant Examiner*—F. F. Calvetti
*Attorney*—Peter L. Berger

[57] ABSTRACT

A process for increasing the sedimentation rate of heterogeneous colloidal suspension systems comprises the step of subjecting the system to an electromagnetic field in the radio frequency range.

9 Claims, No Drawings

PROCESS FOR INCREASING SEDIMENTATION RATE OF HETEROGENEOUS COLLOIDAL SUSPENSION SYSTEMS

BACKGROUND OF THE INVENTION

This invention relates to a process for coagulation or flocculation of heterogeneous colloidal suspensions, and more particularly, to such a process for increasing the sedimentation rates of suspended particles in such colloidal systems.

The term heterogeneous, as used in this application, is meant to include both colloidal systems having more than one colloidal material and colloidal systems having a single material of non-uniform size.

In many chemical processes involving filtration where heterogeneous colloidal suspensions are present, it is necessary to separate the suspended solids from the liquid. For example, in water purification and sewage and waste water treatment, it is necessary to separate particulates from the liquid or water. Prior art processes require significant time for this separation, frequently requiring recycling or resulting in an incomplete settling out.

Separating suspensoids and colloidal suspensions of a single material of different sizes from the liquid is an important step in the treatment of industrial waste prior to its discharge. Presently, apparatus for treating such waste is complex, enormous and generally expensive. In addition to these disadvantages, the treatment process is often incomplete thus requiring the above-mentioned recycling. One problem relating to flocculation which has to be surmounted by the steel and metal finishing industries is that of spent pickle liquor. The pickle liquor is an aqueous solution containing from 0.5 to 10 percent hydrochloric or sulfuric acid and about 12 percent iron. Disposal methods include discharge to a waterway, deep well disposal, neutralization and sedimentation, recovery of free acid and regeneration of both the iron and acid. None of these approaches is completely satisfactory, either from an economic or a water pollution control standard.

Increasing the sedimentation rate for heterogeneous colloidal systems is also desirable in many industrial processes, where the sedimentation is one step in the complete process. Decreasing the sedimentation time would result in a faster process time which would decrease the cost of the process. As exemplary of such processes, the process time for producing organic dye stuffs, such as phthalocyanine blue, is the settling time. Similarly, by increasing the sedimentation rate, the processing of inorganic pigments, such as titanium dioxide, barium sulfate or Prussian blue is hastened, thus lessening the process cost.

The prior art is replete with many techniques for causing coagulation or flocculation of colloidal suspensions. These include decrease or increase in temperature, light, X- and beta-radiation, mechanical stirring, electric field (as in water-in-oil emulsions), treatment with "tanning" agents, salting-out by high electrolyte concentrations, dialysis, electrodialysis and mutual coagulation of different sols. As stated above, these techniques suffer from many disadvantages, not the least of which is cost and time.

In U.S. Pat. No. 3,256,168 issued on June 14, 1966 to John H. Heller entitled PROCESS FOR CHANGING CHARGES OF MATTER, a process is disclosed in which the colloidal suspension polystyrene latex (PSL) is subjected to a pulsed radio frequency (RF) field to change the electrophoretic mobility of the PSL in the colloidal system. The PSL colloidal system is unique in that it is homogeneous including only a single colloidal material and that material, PSL, is uniform in size and spherical in shape. The prior patent discloses experiments conducted only on this homogeneous and uniform colloidal system. In addition, U.S. Pat. No. 3,256,168 was concerned only with the measurement of the change in surface charge on the PSL which reflects the electrophoretic mobility. As contrasted with the singular parameter of surface charge, the rate of sedimentation is dependent upon many more factors than the electrophoretic mobility. Such other factors include the temperature, viscosity and ionic content of the aqueous medium, the particle concentration, sizes and shapes and the degree of agitation. It is believed the homogeneous PSL did not experience an increase in the sedimentation rate as a result of being exposed to the RF field. Further, in the prior patent the change in surface charge of the particles was found to be extremely frequency sensitive whereas, with the heterogeneous colloidal system used with our invention, the effect on sedimentation rate is much less sensitive to the frequency of the RF field.

An object of our invention is to provide a process for increasing the sedimentation rate for heterogeneous colloidal suspensions.

Another object of the invention is to provide such a process which is relatively simple and inexpensive.

Still another object of the invention is to provide such a process which may readily be used for such heterogeneous colloidal systems such as municipal sewage, industrial wastes and chemical processes involving filtration.

Other objects, advantages, and features of this invention will become more apparent from the following description.

SUMMARY OF THE INVENTION

In accordance with the principles of the invention, the above objects are accomplished by providing a process for increasing the sedimentation rate of heterogeneous colloidal suspensions by subjecting the colloidal suspension to an electromagnetic field in the radio frequency region. An enhanced settling rate is produced without the need for additional electrolytes as frequently utilized in the prior art.

This invention may be used as a secondary treatment stage in in a treatment system, such as used for industrial wastes.

DETAILED DESCRIPTION

Certain experiments were performed which proved the concept of increasing the sedimentation rate of heterogeneous colloidal suspensions.

Colloidal suspensions were put into two glass cuvettes, each measuring 5 cm × 1 cm and compared for percent transmission (%T) at time zero in a Beckman DB spectrophotometer at 600 nanometers. (Light scattering measurements were not possible, and visual, qualitative observations showed more dramatic changes than direct light transmission.) One cuvette was then inserted between two copper plates measuring 5.4 cm × 4.3 cm (23.22 cm² area) spaced 1 cm apart. The output of an RF-generator was applied across these plates and a 5 ohm Koolohm non-inductive resistor was put in series with the generator so that RF current flow could be determined by reading the potential drop on a calibrated Boonton RF voltmeter, model 91H. The potential difference across the plates ranging from 100 to 10,000 volts peak-to-peak was read with a calibrated Tektronix 545 oscilloscope and Jennings divider.

The RF generator was built by General Telephone and Electronics Laboratories, Inc., Bayside, N.Y. and supplied a pulsed output with pulse widths 5 to 100 microsec. and pulse repetition rates of 4 to 1,000 pulses per sec. All equipment was housed in an air-conditioned copper-shielded room.

After exposure in the field for times varying from 1 to 6 minutes, one cuvette was returned to the spectrophotometer and its %T relative to a control cuvette which was not subjected to the RF field was recorded at times ranging from 10 to 60 minutes after the beginning of the experiment. This provided the data on changes in sedimentation rate induced in the particle suspension due to exposure to the radio frequency field.

Stable suspensions representative of biological wastes were prepared from a protohemin (light) suspension containing 35 milligrams of protohemin in 20 ml distilled water and 3 ml pyridine. Effluents from metal working plants were principally studied and were representative of various stages of pickle liquor treatment before discharge to a river or waterway: raw dump to the settling lagoon, wet tank and clarifier samples. The samples were used directly or, as in the case of the dense raw dump, diluted four times with distilled water.

The composition of the dried sludge from the settling lagoons averages as follows:

13.8% water at 212°F
2.0% carbonate ($CO_3^-$)
2.4% silica ($SiO_2$)
15.6% calcium oxide (CaO)
32.5% ferric oxide ($Fe_2O_3$)
28.6% sulphate ($SO_4^-$)
1.8% copper oxide (CuO)
1.2% zinc oxide (ZnO)
0.9% alumina ($Al_2O_3$)

EXAMPLE 1

Results of a typical experiment with inorganic colloids are given in Table I. The wet tank samples from a stage of the pickle liquor treatment were thoroughly shaken up and poured into the control cuvette and the cuvette to be subjected to the RF field. The wet tank sample is a mixture of calcium sulfate, ferrous hydroxide and ferrous hydroxide colloidally suspended in water. The cuvettes were arranged in the spectrophotometer so that any change in the irradiated suspensoid leading to an increased sedimentation rate would be shown by a decrease from 100 percent in %T with reference to the control over a period of time.

TABLE I

| Time (min.) | Transmittance of irrad. sample (%T) ref. unirrad. sample | Δ%T |
|---|---|---|
| 0 | | |
| 1 | Sample in field | |
| 4 | Sample out of field | |
| 5 | 107 | 0 |
| 6 | 94 | 13 |
| 6.15 | 90 | 17 |
| 6.45 | 85 | 22 |
| 7.45 | 90 | 17 |
| 8 | 85 | 22 |
| 9 | 90 | 17 |
| 16 | 95 | 12 |
| 18 | 94 | 13 |

The sample was subjected to the RF field for 3 minutes, frequency: 19MHz, pulse repetition rate: 60 pps, pulse width: 5 microsec., the potential drop across the 5 ohm resistor was 48 Vrms. and the potential across the plates was 6,000 V.

Visual comparison of the irradiated and control samples showed much larger particles in the irradiated sample and these had all settled out within 13 minutes after removal from the RF field. At time 6.45 minutes almost complete settling was observed. The change in Δ%T is not linear with percent sedimentation.

The variation with time of the %T readings reflects three factors in the measurement: first, the light beam goes through the suspension about a third of the way up from the bottom of the cuvette; second, convection stirring caused by the field initially keeps the newly coagulated larger particles in the beam and the initial reading shows an apparent negative effect of the field; then there is a rapid settling, shown by a large change in %T, followed by a return to a value characteristic of dissolved ions absorbing at 600 nM. The negative effect results from the initial agglomeration forming larger particles which causes a decrease in the transmission. When the colloidal suspension is removed from the RF field, this initial negative effect was observed.

EXAMPLE 2

Results of a typical experiment with a model biological colloid are given in Table II. This colloid or stable suspension is composed of a protohemin (light) suspension containing 35 mg of protohemin in 20 ml distilled water and 3 ml pyridine. This heterogeneous colloidal suspension is prepared by dissolving the protohemin, which is a porphyrin compound, in the pyridine, making a solution and rapidly mixing the solution with water. The colloidal suspension precipitates out as a finely divided colloid. Results are given in Table II and it is seen that the initial sedimentation rate was relatively slow, but that the final sedimentation was greater than that shown in Table I. (Results in Table II are expressed as %T, reference air, and show an increase if the field exposure has been effective.)

TABLE II

RF field treatment of a protohemin suspension, 19 MHz, 3 kv, 100 pps, 50 microsec. 7 Vrms. across 5 ohms was measured

| Time (min.) | Transmittance of irrad. sample* (%T) ref. air |
|---|---|
| 0 | 9 |
| 1 | Sample in field |
| 4 | Sample out of field |
| 5 | 9 |
| 2 | 9 |
| 4 | 9 |
| 39 | 16 |
| 60 | 20 |

* Increased sedimentation is shown by increase in %T

EXAMPLES 3–12

Tables III and IV give a summary of experimental conditions and results of a series of experiments with "wet tank" and "raw dump" samples, respectively. The suspended particles had the composition given approximately by the analysis of the dried sludge from the settling lagoons. In preparing samples of the suspensions for experiment, a degree of variability was found.

TABLE III (Wet Tank Samples)

These are secondary stage samples passed from the lagoon and limed to pH 11–12. Time of exposure to the field is 3 min.

| Exp. | Freq (MHz) | PRF (pps) | Pulse width (microsec) | Pot. diff. (kv) | Max. change (%) | Max. rate (%/min.) |
|---|---|---|---|---|---|---|
| 3 | 19 | 100 | 50 | 4 | 5 | 1.3 |
| 4 | 19* | 100 | 50 | 4 | 5 | 3.3 |
| 5 | 12 | 100 | 50 | 2.25 | 5 | .07 |
| 6 | 19 | 600 | 50 | 6 | 20 | 11 |
| 7 | 19 | 600 | 50 | 6 | 16 | 5 |
| 8 | 29.8 | 600 | 50 | 3.3 | 15 | 9 |

*6 min. exposure

The last two columns of this table show the maximum change in transmittance, after exposure to a RF field described in the previous columns, and the maximum change divided by the time during which this change was observed with the spectrophotometer.

TABLE IV

Experiments with "raw dump" samples from the effluent to the lagoon, which is spent pickle liquor limed to pH 11–12. Time of exposure to the field is 3 min.

| Exp. | Freq (MHz) | PRF (pps) | Pulse width microsec | Pot. diff. kv | Max. change % | Max. rate (%/min.) |
|---|---|---|---|---|---|---|
| 9 | 29.8 | 600 | 50 | 3.3 | 12 | 1.4 |
| 10 | 19 | 600 | 50 | 6 | 26 | 3 |
| 11 | 19 | 600 | 50 | 6 | 18 | 2 |
| 12 | 6 | 600 | 50 | 8 | 11 | 1 |

The last two columns of this table show the maximum change in transmittance, after exposure to an RF field described in the previous columns, and the maximum change divided by the time during which this change was observed with the spectrophotometer.

Frequency dependence: The effect of the field on particle behavior is dependent on the particle size distribution. The larger the particle size the lower the frequency for maximum interaction. It is possible that the very high field at the surface of the particle causes a redistribution of charge resulting in a reorientation of the particle dipoles in the field. The end result would then be a head to tail aggregation of particles which overcomes the coulombic repulsion between individual particles and gives larger particles. In a pulsed field, a high pulse repetition rate enhances the effect of the field, possibly, by tending to retain the directional orientation of the dipolar particles.

The particle size distribution of the limed pickle liquor effluents is not known, but is reasonable to assume that "wet tank" and "raw dump" samples had a very similar colloidal particle size distribution. After preliminary ranging experiments, the data of Tables III and IV show that, in the range of 6 to 30 MHz, the most suitable frequency was 19 MHz.

At a frequency of 19 MHz, increase in the average power density, the pulse repetition rate, duration in the field and field strength all lead to an increased coagulation and settling rate. Of these variables, only the time of exposure to the field was an independent variable with available equipment in these experiments.

Heating: It has been known that a rise in temperature will cause coagulation of various sols, including hydrosols of metals. In the experiments 1 through 12, the coagulation was not due to heat since no significant temperature increase was observed.

For other heterogeneous colloidal suspensions, the present invention provides similar benefits. As illustrative of such heterogeneous colloidal suspensions, the following illustrations are set forth in which exposing the colloidal suspensoids to an RF field will manifestly lead to similar results obtained in examples 1 through 12 above. This process for increasing the sedimentation rate is applicable to a wide range of problems where it is necessary to separate suspended solids from liquids.

One such situation relates to pigment separations, which involve the formation of the pigment as a very finely divided precipitate, usually in an aqueous medium containing dissolved salts and other substances. By exposure of the suspension of the precipitate to an RF field, the precipitated pigment will be observed to agglomerate and settle out of the aqueous medium more rapidly and much more completely than the untreated pigment suspension. The process results in several important benefits: processing time is significantly reduced; pigment yields are increased since far fewer unsettled fine particles are left in the supernatant liquor or in the filtrate to go to waste; pollution of the process effluent is reduced very substantially; and simpler sedimentation and filtration equipment can be used to obtain the same or even greater throughput. In the processing of organic pigments such as phthalocyanine blue, the organic colloidal suspension is phthalocyanine blue in aqueous sodium chloride solution.

In the process of inorganic pigments such as titanium oxide, barium sulphate or Prussian blue, the colloidal suspensions are inorganic titanium dioxide, inorganic barium sulphate in aqueous acidic sodium chloride, and organic Prussian blue in aqueous sodium chloride and sodium ferrocyanide, respectively.

The following is a list of other situations with the colloidal suspension indicated.

In the preparation of industrial catalysts, such as platinum impregnated alumina reforming catalysts, the colloidal suspension is inorganic aluminum hydroxide colloidal gel containing adsorbed chloroplatinic acid.

In the coagulation and separation of emulsion polymers such as polyacrylonitrile and acrylonitrile styrene-butadiene polymers, the colloidal suspension is organic polyacrylonitrile powder in aqueous medium containing inorganic salts and emulsifying agents.

In the recovery of metals from grinding and machining operations, the colloidal suspension are inorganic metals and metal oxides mixed with carborundum or other abrasive particles suspended in water mixed with cutting oils. The metals may be iron, steel, copper, aluminum, titanium, brass, bronze, etc., which may be partially oxidized.

In the recovery of mineral values from smelter stack scrubber water, the colloidal suspension is inorganic metal sulfides and oxides in water.

In the clarification of paper mill white water, the colloidal suspension is organic finely divided cellulose in water containing salts.

In the clarification of steel slabbing mill waste water, the colloidal suspension is inorganic iron hydroxides and sulfides with calcium sulfate and organic acid salts.

The present invention, as described above, has many applications in which it would be advantageous to increase the sedimentation or settling rate. With respect to a heterogeneous colloidal system such as spent pickle liquor, the results obtained are astonishing, unexpected, and not readily explainable. Empirically, the increase in sedimentation rate has been achieved, but, unfortunately, the actual mechanism for such increase in sedimentation rate is not clear.

It will thus be seen that the objects set forth above, among those made apparent from the preceding description, are efficiently attained, and, since certain changes may be made in carrying out the above process without departing from the scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described our invention, what we claim as new and desire to secure by Letters Patent is:

1. A process for increasing the sedimentation rate of suspensoids in a heterogeneous colloidal suspension to cause an agglomeration of said suspensoids comprising the step of subjecting said colloidal suspension to electromagnetic radiation from a radio frequency source, the temperature of said colloidal suspension remaining substantially constant while said colloidal suspension is subjected to said electromagnetic radiation.

2. A process for increasing the sedimentation rate of suspensoids in a heterogeneous colloidal suspension as set forth in claim 1, wherein said radio frequency source produces a pulsed radio frequency signal.

3. A process for increasing the sedimentation rate of suspensoids in a heterogeneous colloidal suspension as set forth in claim 1, wherein said heterogeneous colloidal suspension comprises at least two differently colloidally suspended materials.

4. A process for increasing the sedimentation rate of suspensoids in a heterogeneous colloidal suspension as set forth in claim 1, wherein said heterogeneous colloidal suspension comprises a single colloidally suspended material of non-uniform size.

5. A process for increasing the sedimentation rate of suspensoids in a heterogeneous colloidal suspension as set forth in claim 1, wherein said heterogeneous colloidal suspension is protohemin suspended in water and pyridine.

6. A process for increasing the sedimentation rate of suspensoids in a heterogeneous colloidal suspension as set forth in claim 1, wherein said heterogeneous colloidal suspension is calcium sulfate, ferric hydroxide and ferrous hydroxide in water.

7. A process for increasing the sedimentation rate of suspensoids in a heterogeneous colloidal suspension as set forth in claim 1, wherein said radio frequency field is approximately at 19 megahertz.

8. A process for increasing the sedimentation rate of suspensoids in a heterogeneous colloidal suspension as set forth in claim 1, wherein said heterogeneous colloidal suspension is organic.

9. A process for increasing the sedimentation rate of suspensoids in a heterogeneous colloidal suspension as set forth in claim 1, wherein said heterogeneous colloidal suspension is inorganic.

* * * * *